(12) United States Patent
Matthews et al.

(10) Patent No.: US 10,554,572 B1
(45) Date of Patent: Feb. 4, 2020

(54) SCALABLE INGRESS ARBITRATION FOR MERGING CONTROL AND PAYLOAD

(71) Applicant: Innovium, Inc., San Jose, CA (US)

(72) Inventors: William Brad Matthews, San Jose, CA (US); Paul Roy Kim, Fremont, CA (US); Puneet Agarwal, Cupertino, CA (US)

(73) Assignee: Innovium, Inc., San Jose, CA (US)

( * ) Notice: Subject to any disclaimer, the term of this patent is extended or adjusted under 35 U.S.C. 154(b) by 221 days.

(21) Appl. No.: 15/433,825

(22) Filed: Feb. 15, 2017

Related U.S. Application Data

(60) Provisional application No. 62/297,329, filed on Feb. 19, 2016.

(51) Int. Cl.
*H04L 12/865* (2013.01)
*H04L 12/863* (2013.01)
*H04L 29/06* (2006.01)

(52) U.S. Cl.
CPC ...... *H04L 47/6275* (2013.01); *H04L 47/6265* (2013.01); *H04L 69/161* (2013.01)

(58) Field of Classification Search
None
See application file for complete search history.

(56) References Cited

U.S. PATENT DOCUMENTS

| | | | |
|---|---|---|---|
| 5,402,478 A | 3/1995 | Hluchyj et al. | |
| 7,706,316 B1 | 4/2010 | Kuik | |
| 2003/0074473 A1 | 4/2003 | Pham et al. | |
| 2008/0259799 A1* | 10/2008 | van Beek | H04L 47/2416 370/235 |
| 2009/0240850 A1* | 9/2009 | Li | H04L 47/52 710/54 |
| 2010/0118884 A1* | 5/2010 | Hendel | G06F 15/17375 370/412 |
| 2012/0327779 A1* | 12/2012 | Gell | H04L 47/2475 370/238 |
| 2013/0044755 A1* | 2/2013 | Liu | H04L 47/568 370/394 |

(Continued)

OTHER PUBLICATIONS

United States Patent and Trademark Office, U.S. Appl. No. 16/033,680, Non-Final Office Action dated Jun. 24, 2019.

*Primary Examiner* — Phirin Sam
(74) *Attorney, Agent, or Firm* — Wong & Rees LLP; Karl T. Rees

(57) ABSTRACT

Approaches, techniques, and mechanisms are disclosed for improving the efficiency with which data units are handled within a device, such as a networking device. Received data units, or portions thereof, are temporarily stored within one or more memories of a merging component, while the merging component waits to receive control information for the data units. Once received, the merging component merges the control information with the associated data units. The merging component dispatches the merged data units, or portions thereof, to an interconnect component, which forwards the merged data units to destinations indicated by the control information. The device is configured to intelligently schedule the dispatching of merged data units to the interconnect component. To this end, the device includes a scheduler configured to select which merged data units to dispatch at which times based on a variety of factors described herein.

20 Claims, 9 Drawing Sheets

(56) References Cited

U.S. PATENT DOCUMENTS

| | | | | |
|---|---|---|---|---|
| 2013/0084063 | A1* | 4/2013 | Hu | H04L 49/10 |
| | | | | 398/2 |
| 2013/0151646 | A1* | 6/2013 | Chidambaram | H04L 47/6205 |
| | | | | 709/213 |
| 2013/0235880 | A1* | 9/2013 | Goldman | H04L 47/629 |
| | | | | 370/412 |
| 2014/0146682 | A1* | 5/2014 | Kakadia | H04L 47/28 |
| | | | | 370/238 |
| 2014/0185368 | A1* | 7/2014 | Zecharia | G11C 11/413 |
| | | | | 365/154 |
| 2014/0281809 | A1* | 9/2014 | Billa | G06F 17/30327 |
| | | | | 714/764 |
| 2015/0121395 | A1* | 4/2015 | Ansari | G06N 5/02 |
| | | | | 718/104 |
| 2015/0156129 | A1* | 6/2015 | Tsuruoka | H04L 47/193 |
| | | | | 370/235 |
| 2015/0229567 | A1* | 8/2015 | Hussain | H04L 45/00 |
| | | | | 370/229 |
| 2015/0263955 | A1* | 9/2015 | Talaski | H04L 69/22 |
| | | | | 711/108 |
| 2016/0156562 | A1* | 6/2016 | Vedula | H04L 41/5025 |
| | | | | 370/235 |
| 2017/0310756 | A1* | 10/2017 | Pandya | H04L 29/06 |

\* cited by examiner

SCALABLE INGRESS ARBITRATION FOR MERGING CONTROL AND PAYLOAD

PRIORITY CLAIM

This application claims benefit under 35 U.S.C. § 119(e) of Provisional Application No. 62/297,329, filed Feb. 19, 2016, the entire contents of which is hereby incorporated by reference as if fully set forth herein.

TECHNICAL FIELD

Embodiments relate generally to data handling in systems such as, without limitation, data switching networks, and, more specifically, to techniques for improving resource utilization while handling payload data associated with asynchronously received control information.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A computer network or data network is a set of computing components interconnected by communication links. Each computing component may be a separate computing device, such as, without limitation, a hub, switch, bridge, router, server, gateway, or personal computer, or a component thereof. Each computing component is considered to be a node within the network. A communication link is a mechanism of connecting at least two nodes such that each node may transmit data to and receive data from the other node. Such data may be transmitted in the form of signals over transmission media such as, without limitation, electrical cables, optical cables, or wireless media.

The structure and transmission of data between nodes is governed by a number of different protocols. There may be multiple layers of protocol, typically beginning with a lowest layer, such as a "physical" layer that governs the transmission and reception of raw bit streams as signals over a transmission medium. Each layer defines a data unit (the protocol data unit, or "PDU"), with multiple data units at one layer combining to form a single data unit in another. Additional examples of layers may include, for instance, a data link layer in which bits defined by a physical layer are combined to form a frame or cell, a network layer in which frames or cells defined by the data link layer are combined to form a packet, and a transport layer in which packets defined by the network layer are combined to form a TCP segment or UDP datagram. The Open Systems Interconnection model of communications describes these and other layers of communications. However, other models defining other ways of layering information may also be used. The Internet protocol suite, or "TCP/IP stack," is one example of a common group of protocols that may be used together over multiple layers to communicate information. However, techniques described herein may have application to other protocols outside of the TCP/IP stack.

A given node in a network may not necessarily have a link to each other node in the network, particularly in more complex networks. For example, in wired networks, each node may only have a limited number of physical ports into which cables may be plugged in to create links. Certain "terminal" nodes—often servers or end-user devices—may only have one or a handful of ports. Other nodes, such as switches, hubs, or routers, may have a great deal more ports, and typically are used to relay information between the terminal nodes. The arrangement of nodes and links in a network is said to be the topology of the network, and is typically visualized as a network graph or tree.

A given node in the network may communicate with another node in the network by sending data units along one or more different "paths" through the network that lead to the other node, each path including any number of intermediate nodes or "hops." The node may identify these paths in a variety of manners. For instance, the paths may be specified to the node in advance, and/or the node may identify the paths by analyzing a topological map, such as the node may build over time through observations of certain types of messages from other nodes in the network.

In computer networks and other environments, a device may include any number of internal hardware and/or software components configured to handle the movement of data between processing components within the device and, eventually, out of the device. It is desirable for these components to quickly determine where to send and/or store data for processing, and to expediently send and/or store that data to the appropriate destination once determined.

BRIEF DESCRIPTION OF THE DRAWINGS

The present inventive subject matter is illustrated by way of example, and not by way of limitation, in the figures of the accompanying drawings and in which like reference numerals refer to similar elements and in which.

DETAILED DESCRIPTION

Figure 1:
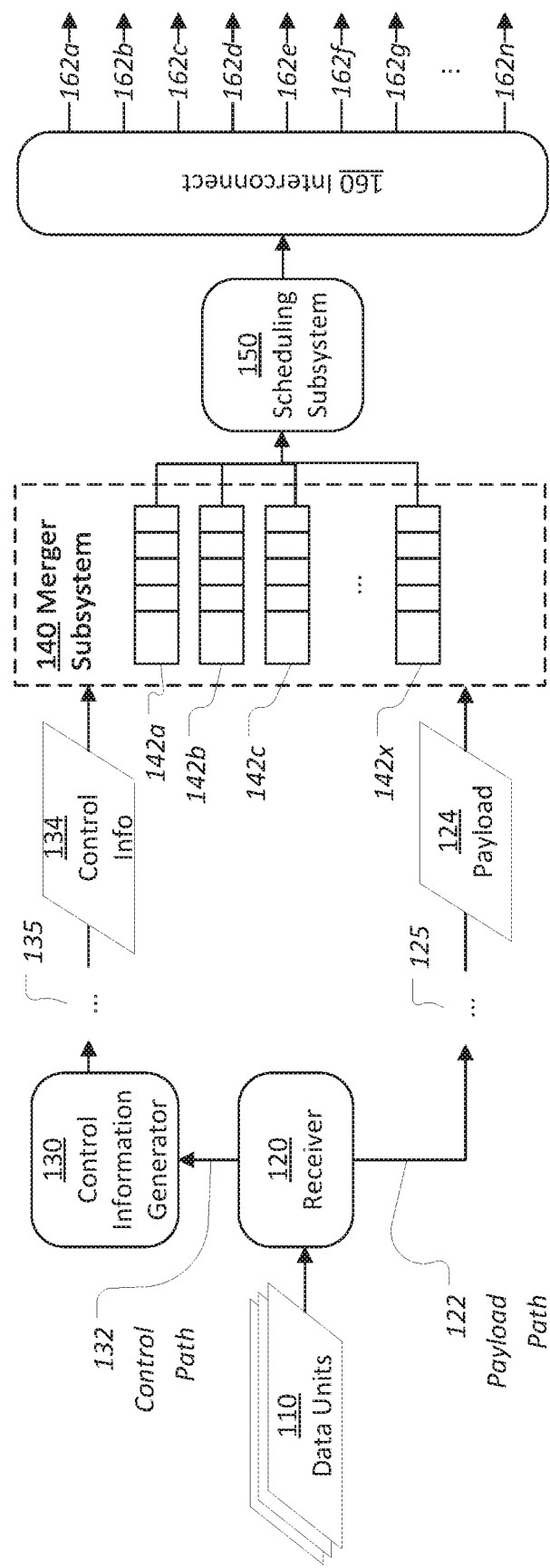
FIG. 1 is an illustrative view of various aspects of a data handling system in which techniques described herein may be practiced.

In the following description, for the purposes of explanation, numerous specific details are set forth in order to provide a thorough understanding of the present invention. It will be apparent, however, that the present invention may be practiced without these specific details. In other instances, certain structures and devices are shown in block diagram form in order to avoid unnecessarily obscuring the present invention.

Embodiments are described herein according to the following outline:

1.0. General Overview
2.0. Structural Overview
2.1. Control and Data Paths
2.2. Merger Component
2.3. Interconnect Component
2.4. Scheduler
2.5. Miscellaneous
3.0. Example Architectures
3.1. Data Handling System with Cell-Based Traffic
3.2. Example Merger Subsystem
3.3. Multiple Schedulers
3.4. Multiple Interconnects
3.5. Multiple Merging Components
3.6. Other Examples
4.0. Example Process Flow
5.0. Example Embodiments
6.0. Implementation Mechanism—Hardware Overview
6.1. Example Networking Apparatus
6.2. Example Computing Device
7.0. Extensions and Alternatives

1.0. General Overview

Approaches, techniques, and mechanisms are disclosed for improving the efficiency with which data units are handled within a device. In general, received data units, or portions thereof (also referred to herein as the "payload"), are temporarily stored within one or more memories of a merging component, while the merging component waits to receive control information for the data units. For instance, the merger component may be waiting for one or more control processing components to generate the control information for the data units and forward the generated control information to the merging component. The merger component then merges the control information with the associated data units. The merging component dispatches the merged data units, or portions thereof, to an interconnect component, such as a crossbar, which forwards the merged data units to destinations indicated by the control information.

According to an embodiment, rather than simply merging and dispatching data units when the associated control information for the data units is received, in the order the control information is generated, the device is configured to intelligently schedule the dispatching of merged data units to the interconnect component. To this end, the device includes a scheduling component ("scheduler") configured to select which merged data units to dispatch at which times based on a variety of factors described herein. In an embodiment, for example, the one or more memories of the merger component are arranged as a plurality of queues into which data units, or portions thereof, are placed. The scheduling component selects which queue(s) to read and transmit from at any given time based on factors such as the destination processing component for a data unit, the source port of the data unit, destination port(s) for the data unit, priority levels, and so forth.

More generally, the techniques may be utilized for merging and dispatching any sort of payload data with control information. That is, the data unit is more generally any collection of data grouped together within a specific context, which is buffered while awaiting control information for the context. The release of the payload information is scheduled once the context becomes active (i.e. the control information for the context is received).

In other aspects, the invention encompasses processes, computer apparatuses, and/or computer-readable media configured to carry out the foregoing techniques.

2.0. Structural Overview

The techniques described herein may be used in any context in which data units are stored while waiting for merger with associated control information. For illustrative purposes, examples of such contexts are described in this section. However, the inventive techniques need not be limited to such contexts.

FIG. 1 is an illustrative view of various aspects of a data handling system 100 in which techniques described herein may be practiced, according to an embodiment. Data handling system 100 is a component of an apparatus such as a computing device comprising any combination of hardware and software configured to implement the various logical components described herein. For example, the apparatus may be a single networking computing device, such as a router or switch, in which some or all of the components 120-160 described herein are implemented using application-specific integrated circuits (ASICs) or field programmable gate arrays (FPGAs). As another example, an implementing apparatus may include one or more memories storing instructions for implementing various components described herein, one or more hardware processors configured to execute the instructions stored in the one or more memories, and various data repositories in the one or more memories for storing data structures utilized and manipulated by the various components 120-160.

In an embodiment, an apparatus may have any number of data handling systems 100, which may be utilized for a variety of purposes. For example, the forwarding logic of a network device may include any number of data handling systems 100 configured to move data units inside a network device.

2.1. Control and Data Paths

Data handling system 100 is configured to handle data units 110. A data unit 110 may be, for instance, a packet, cell, frame, or any other suitable data unit. The data units 110 are processed by a reception component 120. Data units 110 may be received from a source that is external to the apparatus in which the data handling system 100 is implemented, or may be directed to reception component 120 by another internal component of the apparatus. For example, in an embodiment, a data unit 110 may be received through any of a plurality of different ports of apparatus, and the reception component 120 may be coupled to these ports. In an embodiment, the reception component 120 may perform various low-level operations such as assembling data units and/or subunits from bits and/or other subunits.

The reception component 120 then sends the data unit 110, or at least portions of the data unit 110, along two different data paths. Each data path may be a physical path (e.g. specific circuitry) or logical. The reception component 120 sends at least a first part of the data unit 110 down a first path 132 (referred to herein as the "control" path 132), and at least the remainder of the data unit 110 down a second data path 122 (referred to herein as the "payload" path 122).

The first portion of the data unit 110 that is sent down the control path 132 may be, for instance, a header, a fixed size portion of the data unit 110 that contains the header, a start-of-packet ("SOP") subunit of the data unit 110 (e.g. the first cell or frame of a packet), or any other portion that includes enough information to generate control information 134 for the data unit 110. In some embodiments, the entire data unit 110 may be sent down the control data path 132.

The control path 132 includes one or more control processing units, collectively referred to as a control information generator 130, that inspect the first portion of the data unit 110 and generate control information 134 based thereon. The control information 134 may simply include information already in the data unit 110 (e.g. addressing information, priority data, or labels in the header of the data unit 110), may replace such information in the data unit 110 (e.g. a new destination address or a revised priority level), or may be additive with respect to the information in the header (e.g. internal markings, path information, tracking information, a next internal destination component to process the data unit, other handling instructions, etc.). The control information 134 may be generated based on rule-based and/or hard-coded logic within the control information generator 130. In an embodiment, the control information 134 may optionally be processed by one or more additional components 135.

The portion of the data unit 110 sent down the data path 122 is referred to herein as payload 124. Payload 124 may be the entire data unit 110, or at least the remainder of the data unit 110, depending on the embodiment. The data path 122, in its simplest form, simply moves the payload 124 from the reception component 120 to a temporary storage location within a memory 142 of the merging component 140. Optionally, the data path 122 may include any number of intermediate relays or processing components 125 through which the payload 124 is routed, and which may or may not transform the payload 124. In most embodiments, any processing along the data path 122 is performed relatively quickly, such that at least some of the payload 124 is stored in memory 142 of the merging component 140 prior to the control information generator 130 generating the control information 134 associated with the data unit 110.

In some embodiments, any number of data units 110 may be received concurrently. The reception component 120 need not wait for a full data unit 110 to be received, but rather may begin sending subunits down the control path 132 and/or data path 122 as soon as the subunits are assembled. For instance, for a packet that is divisible into cells, the reception component 120 may send the SOP cell of the data unit 110 down the control path 132 before having even received other cells of the data unit 110. Middle-of-packet cells (and optionally the SOP cell) may also be sent down the data path 122 before the end-of-packet ("EOP") cell is received. Moreover, portions of different data units 110 (e.g. having been received concurrently on different ports) may be sent down the data path 122 before either of the different data units 110 have been fully received. Thus, for example, cells from different data units 110 may be interleaved amongst each other as they are sent down the data path 122.

In an embodiment, the reception component 120 and control information generator 130 may be implemented by, or as part of, one or more ASICs or FPGAs within the implementing apparatus. In an embodiment, the separation of the data unit 110 along two different paths enables hardware designs that leverage different operating frequencies for the circuitry and memory units used along each path, so as to enable the generation of the control information 134 along the control path 132 using higher cost but faster hardware without requiring that hardware to store the entire data unit 110. Of course, there may be any number of other contexts where such separation is useful.

2.2. Merger Component

Through a variety of techniques, including without limitation those depicted in FIG. 1 as described above, control information 134 and payload data 124 arrive asynchronously at a merger component 140 through two separate data paths 122 and 132. The merger component 140 may be implemented by, or as part of, one or more ASICs or FPGAs, which may be the same as or different from the hardware that implements the control path 132 and data path 122. The merger component 140 may include any number of memories 142 of any suitable size, in which data units 110 may be stored temporarily (i.e. buffered and/or queued) while waiting for associated control information 134 to be received from the control path 132.

As explained above, the merger component 140 comprises one or more memories 142a-142x, collectively memories 142, in which data units 110, or portions thereof, may be stored while waiting for the control information 134 associated with the data units 110. In embodiments with multiple memories 142 in which data units may be stored, a variety of algorithms may be utilized to identify the exact storage location in which to store a given payload 124. For instance, a round-robin approach may be utilized to place data units 110 or subunits in different memory banks as they are received. As another example, if subunits of a data unit 110 are received separately, the location of already-stored subunits may be chosen for subsequent subunits. The amount of available space in each memory 142 may also be used to decide where to store a given payload 124, so as to attempt to balance memory utilization amongst the different memories 142.

The merger component 140 may receive control information 134 for a data unit 110 in any of a variety of forms, including in the form of a header (e.g. to replace or be inserted into the data unit), a wrapper to be prepended to the data unit 110, or a separate data structure intended to accompany the data unit 110. The control information 134 may include data that explicitly or implicitly identifies at least one path or target component 162 to which the data unit should be forwarded for further processing. The control information 134 may optionally include a variety of other information, including information conventionally found in a header, extra processing instructions intended for downstream components of the implementing apparatus, and so forth.

When the merger component 140 receives control information 134, the merger component 140 sends some or all of the control information 134 to a scheduling subsystem 150, also referred to as a scheduler 150, for analysis. Using techniques as described herein, the scheduler 150 uses some or all of the control information 134 to decide when to dispatch the data unit 110 to a next destination component 162. At or before the appropriately scheduled dispatch time, the merger component 140 utilizes identification data within the control information 134, such as a packet identifier embedded within the header by the sending network device or the reception component 120, to locate and read the data unit 110 (or portions of the data unit 110) that is associated with the control information 134 from the one or more memories 142 of merger component 140. The merger component 140 then merges the control information 134 with the data unit 110 (or data unit portions), either by modifying the data unit 110 itself (e.g. prepending the control information 134 to the data unit 110 or a SOP cell for data unit 110, or inserting the control information 134 within the data unit 110), or by sending the control information 134 adjacent to the data unit 110 when dispatching the data unit 110 to its next destination 162.

2.3. Interconnect Component

The merger component 140 sends the merged data unit 110 out via an interconnect component 160, also referred to as interconnect 160, to the destination component identified by the control information. The interconnect 160 may be any component, such as a crossbar, capable of accepting a data unit 110 as input and sending or writing that data unit 110 as output to one or more identified destinations 162 out of a plurality of different destinations 162 that are coupled to the interconnect 160. The interconnect component 160 may comprise one or more outgoing interfaces for each possible destination component 162 for a merged data unit 110. Destination components 162, illustrated as destinations 162a-162n, may include, for example, processing components, routing decision components, packet inspection components, traffic action control components, tracking or reporting components, outgoing ports or interfaces, queues or buffers for such components, other data handling systems 100, or any other suitable destination component. Examples of some destination components are described in, without limitation, U.S. application Ser. Nos. 14/958,830, 14/973, 541, 15/045,039, and 62/289,199, the entire contents of each of which are hereby incorporated by references for all purposes, as if set forth in their entirety herein.

The interconnect 160 receives merged data units 110 from one or more merger components 140 and directs the merged data units 110 out the appropriate interfaces to reach the destination component(s) 162 identified by the associated control information 134. The interconnect component 160 may be configured to send a single data unit 110 out on one interface (unicast) or configured to send a copy of the data unit 110 to each of any number of interfaces (multicast), depending on how many destinations 162 are identified by the control information. The interconnect 160 can send traffic out each interface concurrently.

Depending on the embodiment, the interconnect 160 receives and dispatches data units 110 as separate portions (e.g. the individual cells of a packet) or all at once. In at least one embodiment, portions of a data unit 110 may be dispatched even before the merger component has received the entire data unit 110 (e.g. for data flows with large packets where the control information 134 is generated from the SOP cell before the EOP cell is received or completes the data path 122).

In an embodiment, a destination 162 may be another processing component coupled to the interconnect 160 via circuitry through which signals representing the data units 110 sent from the interconnect 160 are received directly by the processing component. In an embodiment, a destination 162 may be a processing component configured to read data units 110 sent by the interconnect 162 from a memory (e.g. a register). Thus, the outgoing interface of interconnect 160 that corresponds to this destination 162 is configured to write data units 110 to this memory rather than send the data directly to the corresponding processing component.

After dispatch from the interconnect component 160, the data units are processed by the identified destination component(s) 162 in accordance with their respective control information 134. In embodiments where the implementing apparatus is a network device, the data units 110 are eventually, if not dropped, sent out via one or more outgoing ports of the apparatus to other nodes in the network. In some embodiments, some or all of the control information 134 may be removed before sending the data units 110 from the node.

2.4. Scheduler

As described above, the scheduler component 150 determines when to dispatch a data unit 110 from the merger component 140. The scheduler component 150 waits until control information 134 has been received for a data unit 110, and then uses any suitable factors to determine when the merger component 140 should send the (merged) data unit 110 to the interconnect component 162.

In an embodiment, the scheduler 150 is configured to ensure that data units 110 received over certain ports are dispatched at a specified rate relative to other ports. For instance, a networking device may have a 10 Gbps inbound port and a 1 Gbps inbound port. The scheduler 150 may implement logic to ensure that, for every one data unit 110 dispatched for a 1 Gbps port, ten data units 110 are dispatched for the 10 Gbps port, assuming the requisite numbers of data units 110 are actually available in memories 142. Of course, any combinations of ratios are possible for any number of ports. Moreover, ratios may also or instead be enforced relative to other categorizations of data units, such as queues, destination ports, service classes or other priority levels, traffic flows, and so forth.

In an embodiment, the scheduler 150 is configured to schedule data units 110 based on prioritization levels determined either by the control information generator 130 or embedded within the data units 110. A data unit 110 may have been designated as having a priority level for any number of reasons. The scheduler 150 may prioritize such data units 110 in a variety of manners, depending on the embodiment. For example, the scheduler 150 may simply dispatch data units 110 with higher priority levels before data units 110 with lower priority levels. Or, the scheduler 150 may utilize priority information to determine which data units 110 within a given categorization to dispatch first (e.g. while still enforcing ratios relative to other categorizations). As another example, the priority information may be one of several signals used to rank data units (e.g. along with the amount of time the data unit has already waited in queue, port ratios, etc.), and a schedule may be generated based on the ranking.

In an embodiment, the scheduler 150 is configured to optimize utilization of outbound interfaces from the interconnect 160. For example, if no interfaces are available to dispatch the highest priority data unit 110 in a queue to a target destination component 162 identified by the control information 134, then the scheduler 150 will wait to schedule the data unit 110 until a time when an interface is available, and instead select to send out a second data unit 110 for which outgoing interfaces are still available.

In an embodiment, the scheduler 150 is configured to optimize memory utilization within the merger component 140. For instance, supposing that the merger component 140 included four memory banks 142a-142d, and two high priority data units 110 resided in the first data bank 142a, the merger component 140 would schedule only one of the high priority data units 110 from the first memory bank 142a for dispatch at a given time, and select potentially lower priority data units 110 from other memory banks 142b-d for dispatch instead of the other high priority data unit 110, to load balance memory utilization.

Note that while reference to a schedule is made herein, the scheduler 150 need not actually create and store data representing the schedule, nor determine the entire schedule at once. Rather, the schedule may be formed as the scheduler 150 makes real-time dispatch decisions over multiple intervals of time (e.g. clock cycles, seconds, etc.). For instance, the scheduler 150 may simply determine, as each interval arrives, one or more data units 110 (or portions thereof) to dispatch during that interval. The order in which data units 110 are dispatched over many successive intervals may thus form a "schedule" that is "determined" by the scheduler 150.

On the other hand, while selecting the data unit(s) to dispatch in a given interval, the scheduler 150 may compare resource needs with resource availability for future intervals and identify a schedule of which data units 110 the scheduler 150 intends, at the current moment, to dispatch in those future intervals. This may allow the scheduler 150 to make decisions in the present interval that will optimize resource utilization over a longer period of time. Nonetheless, the scheduler 150 need not commit to such a schedule, but rather may reevaluate its previous decisions as each interval arrives, to take into account additional payloads 124 and/or control information 134 received in the interim.

In an embodiment, the scheduler 150 is configured to use any combination of the foregoing factors, or other factors not described, to schedule dispatch of data units 110 from the merger component 140.

2.5. Miscellaneous

System 100 illustrates only one of many possible arrangements of components configured to provide the functionality described herein. Other arrangements may include fewer, additional, or different components, and the division of work between the components may vary depending on the arrangement. For example, in some embodiments, receiver 120 and/or control information generator 130 may be omitted, along with any other components relied upon exclusively by the omitted component(s). That is, control information 134 and payload 124 may be generated using other means, and then received by the merger subsystem 140. In other embodiments, multiple merger components, multiple schedulers, and/or multiple interconnects may be arranged to provide greater efficiency in certain contexts, as described in other sections.

3.0. Example Architectures 3.1. Data Handling System with Cell-Based Traffic

Figure 2:
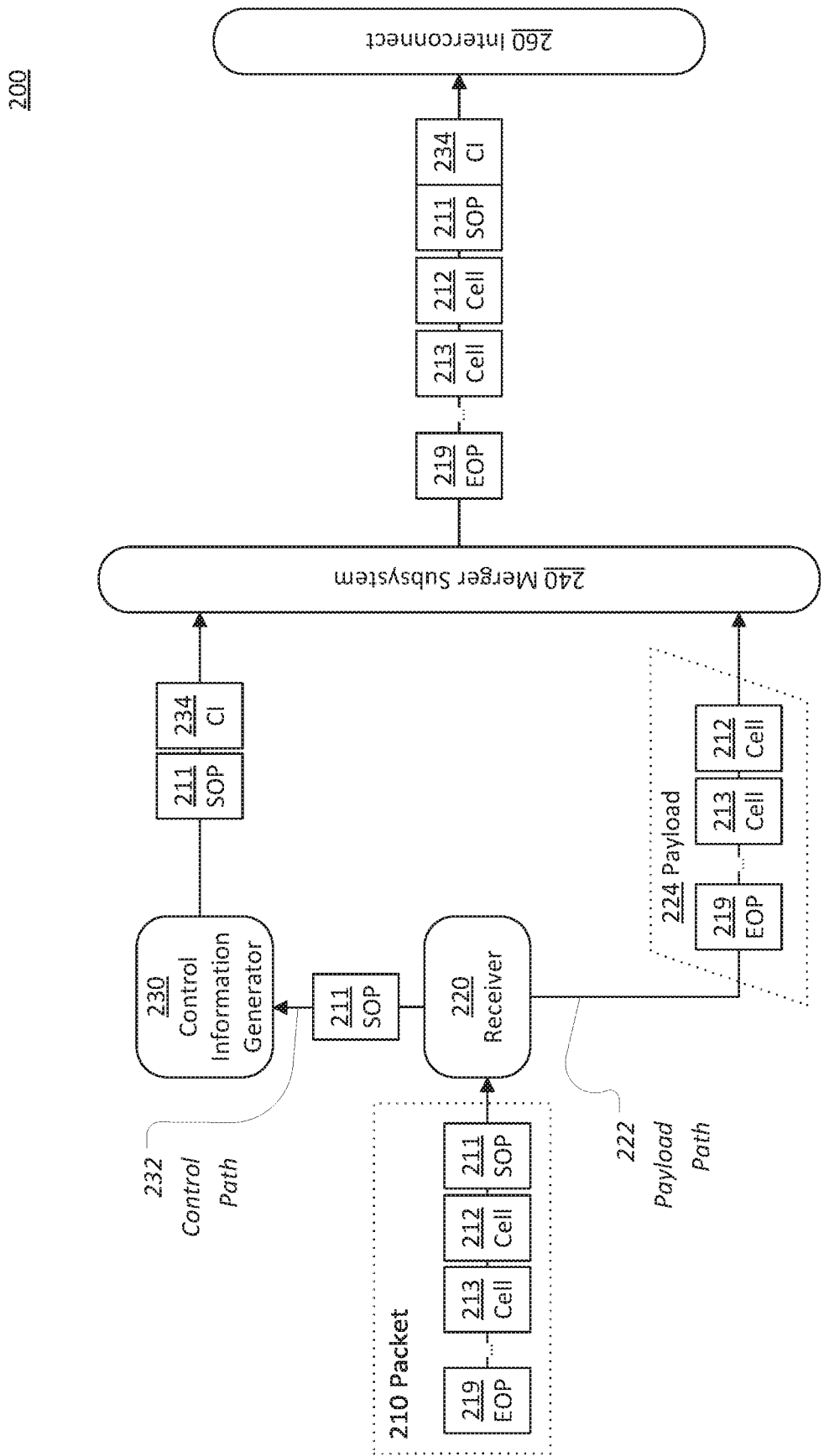
FIG. 2 is an illustrative view of various aspects of an example data handling system handling cell-based traffic.

FIG. 2 is an illustrative view of various aspects of an example data handling system 200 handling cell-based traffic, according to an embodiment. Data handling system 200 is in many aspects similar to data handling system 100 of FIG. 1, though certain details have been omitted for clarity. For instance, receiver 220 of system 200 is similar to receiver 120, control information generator 230 of system 200 is similar to control information generator 130, merger subsystem 240 of system 200 is similar to merger subsystem 140, and interconnect 260 of system 200 is similar to interconnect 160.

However, to better illustrate the flow of a data unit 110 when received as distinct subunits, FIG. 2 illustrates the flow of a packet 210 that is divided into distinct cells 211-219. Cell 211, a SOP cell, is received first at receiver 220. Receiver 220 sends SOP cell 211 along control path 232 to control information generator 230, which will generate control information 234 based on SOP cell 211. Meanwhile, receiver 220 may receive, in turn, cell 212, cell 213, and any number of additional cells of packet 210, up until receiving an EOP cell 219. Receiver 220 sends these cells 212-219 along payload path 222, collectively forming the payload 224 for packet 210.

Merger subsystem 240 buffers any cells 212-219 that are received from the payload path 222 before receiving SOP 211 and control information 234 from the control path 232. The buffered cells 212-219 cannot be sent until SOP 211 and control information 234 are received by and dispatched from merger subsystem 240. Once received by merger subsystem 240, SOP 211 and control information 234 may likewise be buffered until a scheduler subsystem (not depicted) or other resource regulating component determines that resources are available to dispatch SOP 211 and control information 234. Control information 234 may be prepended to SOP 211, as depicted, or otherwise sent to interconnect 260 in association with SOP 211 and/or any other cell 212-219.

Once SOP 211 has been dispatched to interconnect 260, a scheduler subsystem or other resource regulating component may dispatch any cells 212-219 that are buffered in memory at merger subsystem 240, in turn. Moreover, a scheduler subsystem may immediately dispatch any cells 212-219 received after SOP 211 and control information 234 have been dispatched, though these cells may also be buffered at merger subsystem 240 for some time while waiting for dispatch of any buffered preceding cells of packet 210 and/or while waiting for resources to become available.

Note that, while payload 224 is depicted as comprising all cells of packet 210 except SOP cell 211, the term payload or payload data as used herein may actually refer to any distinct portion of the packet 210 that is sent along the payload path 222. For instance, cell 212 may, by itself, be considered a payload for packet 210, as may cells 213-219, or any combination thereof. Moreover, in an embodiment, SOP 211 may also be sent along the payload path 222 as payload data, in which case it need not necessarily be communicated from control information generator 230 to merger subsystem 240. Furthermore, in an embodiment, any number of additional cells 212-219 may be sent along the control path 232 for analysis when generating control information 234, and thus need not necessarily be communicated along payload path 222 if they are communicated to merger subsystem 240 along the control path 232.

In an embodiment, receiver 220 does not necessarily receive cells 211-219 one after another, but rather may receive any number of other cells for other packets in between receiving each of cells 211-219. Likewise, the scheduling subsystem may dispatch any number of other cells from other packets in between dispatching each of cells 211-219.

Further note that system 200 illustrates only one of many possible arrangements of components configured to handle data flows composed of distinct subunits. Other arrangements may include fewer, additional, or different components, and the division of work between the components may vary depending on the arrangement. More generally, each cell 211-219 may be a portion of data associated with some context (as opposed to packet 210), which is considered to be in an inactive state until control information 234 is received, and in an active state (allowing dispatch of the associated data) thereafter.

3.2. Example Merger Subsystem

Figure 3:
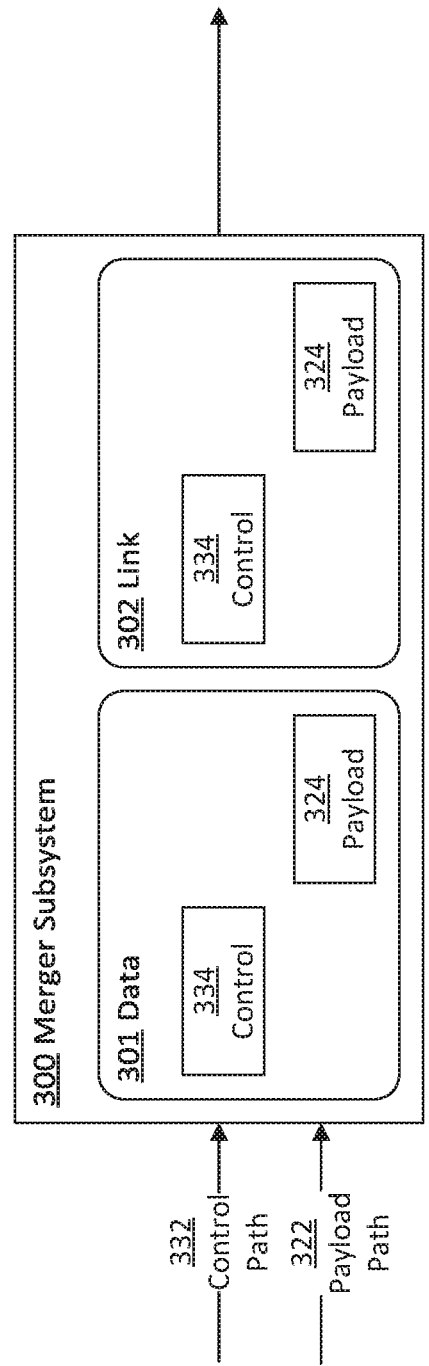
FIG. 3 illustrates an example shared memory implementation of a merger subsystem.

FIG. 3 illustrates an example shared memory implementation of a merger subsystem 300, according to an embodiment. Merger subsystem 300 comprises a first shared memory system 301 for all received data across many different contexts, including control information 334 received via control path 332 and payload data 324 received via a payload path 322. Merger subsystem 300 further comprises a shared memory system 302 for all link information, describing the data memory usage for each context.

Of course, FIG. 3 is but one example of an implementation of a merger subsystem, and other embodiments may include different components in different arrangements.

3.3. Multiple Schedulers

Figure 4:
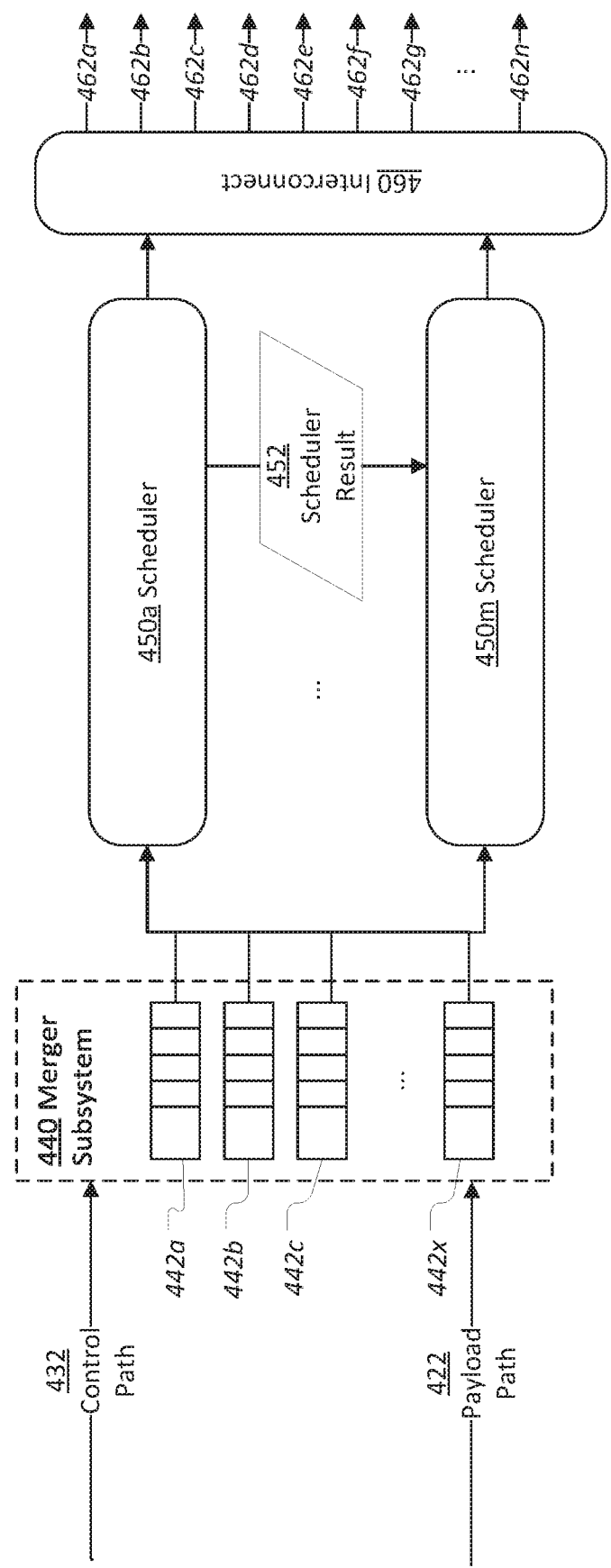
FIG. 4 is an illustrative view of various aspects of an example data handling system comprising multiple scheduler components.

FIG. 4 is an illustrative view of various aspects of an example data handling system 400 comprising multiple scheduler components, according to an embodiment. Data handling system 400 is in many aspects similar to data handling system 100 of FIG. 1, though certain details have been omitted for clarity. For instance, system 400 includes a merger subsystem 440 that is similar to merger subsystem 140, including memories 442 that are similar to memories 142. Likewise, system 400 includes an interconnect 460 that is similar to interconnect 160, with destinations 462 that are similar to destinations 162. Although not depicted, it will be understood that system 400 may in some embodiments likewise include a receiver such as receiver 120 and a control information generator such as control information generator 130.

However, system 400 comprises two or more scheduler components 450a-450m, collectively scheduling components 450. The two or more scheduler components collectively act as a scheduling subsystem by which more than one data unit may be passed to interconnect 460 during a given interval of time. That is, each scheduling component 450a-450m selects a different data unit to dispatch from memory 442 to interconnect 460. Accordingly, interconnect 460 is adapted to include at least one input interface for each scheduler component 450. Moreover, in an embodiment, some or all of memories 442 may also be enhanced to allow for additional parallel dequeues of data units and/or subunits from the memory subsystem. For instance, the memory subsystem bandwidth of the merger component 440 can be increased using several techniques such as increasing the number of physical memory banks, increasing the number of ports on the physical memories, adding a caching bank implemented in flops, and so forth.

In an embodiment, to avoid various conflicts, the scheduler components 450 may be configured to share coordinating result information 452. Such result information 452 may indicate a specific data unit or data unit portion selected by the sharing scheduler component 450, so that other scheduler components 450 do not also select that data unit portion. Additionally, or instead, the result information 452 may include data indicating to which destinations the data units or subunits already selected are to be sent, so that other scheduler components 450 avoid resource conflicts with the corresponding outgoing interfaces of interconnect 460. Additionally, or instead, the result information 452 may include data indicating from which memories 442 data units or data unit portions have already been dispatched, to allow other schedulers 450 to load balance memory utilization or avoid resource conflicts in embodiments where the number of possible read operations on particular memories 442 may be limited in a given interval.

In an embodiment, some or all of the scheduler components 450 may implement a different selection algorithm, thereby reducing the likelihood of selecting the same data unit or subunit, or of introducing resource conflicts.

In an embodiment, the scheduling components 450 are arranged serially such that a first scheduling component 450a selects a first data unit, a second scheduling component 450b then selects a second data unit, and so forth. Selection information 452 is cascaded through each of the additional schedulers 450 to prevent selection collision of the same data unit, the same interconnect output port, or other resource conflicts. That is to say, for example, if scheduler 450a selects a first data unit that is destined for a first output port, scheduler 450a informs scheduler 450b of this choice so that scheduler 450b knows not to select the first data unit or a data unit that also targets the first output port. Scheduler 450b thus waits for information from scheduler 450a before selecting a data unit or data unit portion for dispatch.

In an embodiment, a particular scheduling component 450 may be configured to pre-select an ordered list of multiple data units or data unit portions. As the scheduling result information 452 is received from other scheduling components 450, the particular scheduling component 450 removes the data units or data unit portions that have been selected by other scheduling components 450, or whose selection is precluded by resource conflicts with the other selections. When it is finally the turn of the particular scheduling component 450 to select a data unit, the first data unit in the list that has not been eliminated is selected, if any.

Among other aspects, such an architecture may allow better utilization of interconnect output bandwidth. In an embodiment, for example, for M schedulers used in the architecture, unicast traffic can utilize M/N output ports of the interconnect as opposed to 1/N, improving interconnect bandwidth utilization.

3.4. Multiple Interconnects

Figure 5:
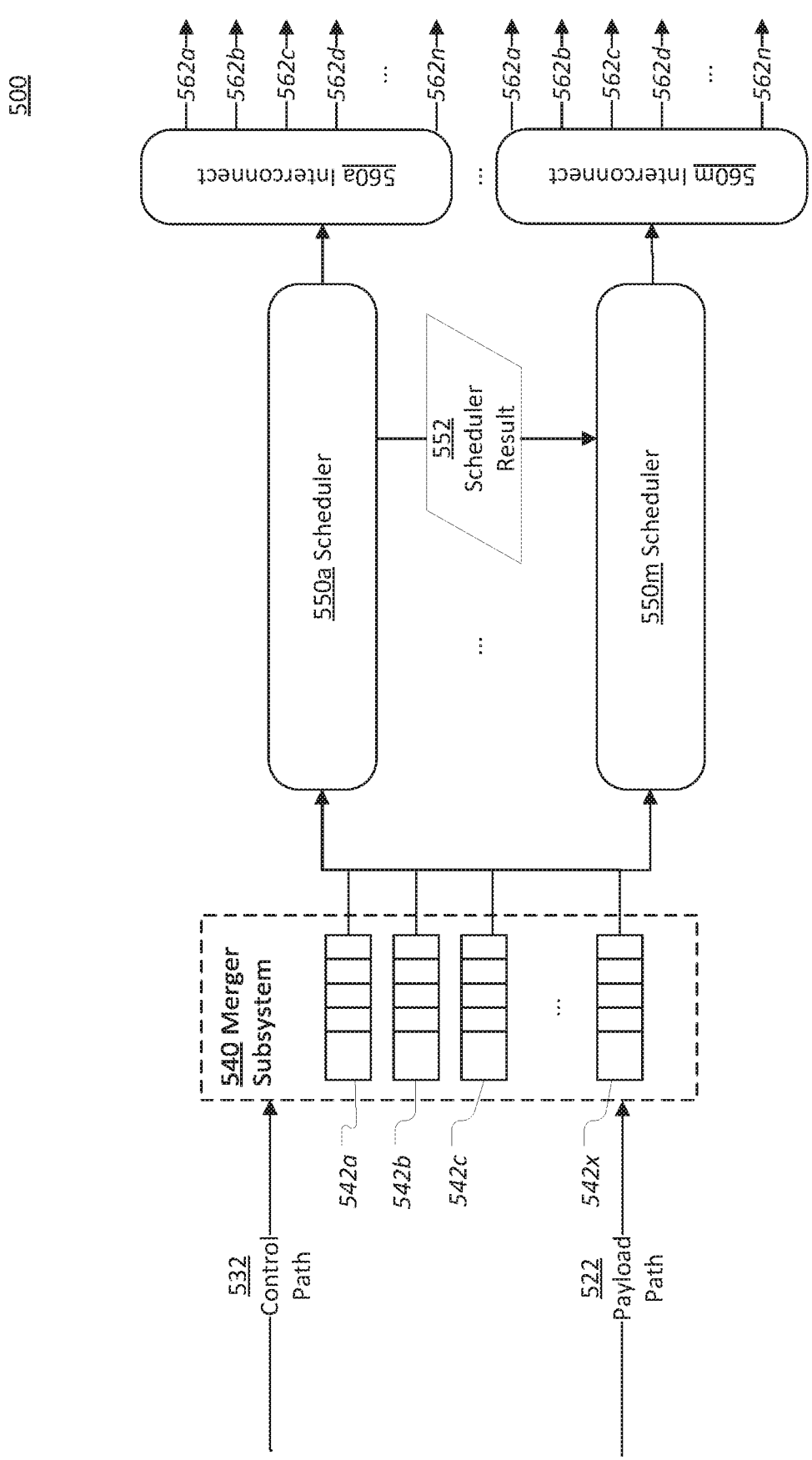
FIG. 5 is an illustrative view of various aspects of an example data handling system comprising multiple interconnects.

FIG. 5 is an illustrative view of various aspects of an example data handling system 500 comprising multiple interconnects, according to an embodiment. Data handling system 500 is in many aspects similar to data handling system 400 of FIG. 4 and data handling system 100 of FIG. 1. For instance, system 500 includes a merger subsystem 540 that is similar to merger subsystem 140, including memories 542 that are similar to memories 142. Likewise, system 500 includes multiple schedulers 550a-550m that are similar to schedulers 450a-450m. Although not depicted, it will be understood that system 400 may in some embodiments likewise include a receiver such as receiver 120 and a control information generator such as control information generator 130.

However, instead of single interconnect 160 or 460, system 500 comprises multiple interconnects 560a-560m, collectively interconnects 560. Each interconnect 560a-560m is, by itself, similar to interconnect 160. However, each interconnect 560 is paired up with a different scheduler 550. Each destination 562 is enhanced to allow for data to be received from multiple ports in parallel. For instance, in an embodiment, a destination 562 may receive data from M different ports in parallel, where M is the number of interconnects 560 (that is to say, one from each scheduler 550/interconnect 560 pair). As with system 400, selection information 552 may be shared between each of the additional schedulers 550 to prevent selection collision of the same data unit and/or other resource conflicts.

Among other aspects, this architecture increases the amount of bandwidth to each single destination.

A further extension, in an embodiment, is for a system to have M interconnects, and multiple schedulers for each of the M interconnects. Among other aspects, this combined architecture increases the bandwidth to each single destination while also improving bandwidth utilization for each interconnect.

3.5. Multiple Merging Components

Figure 6:
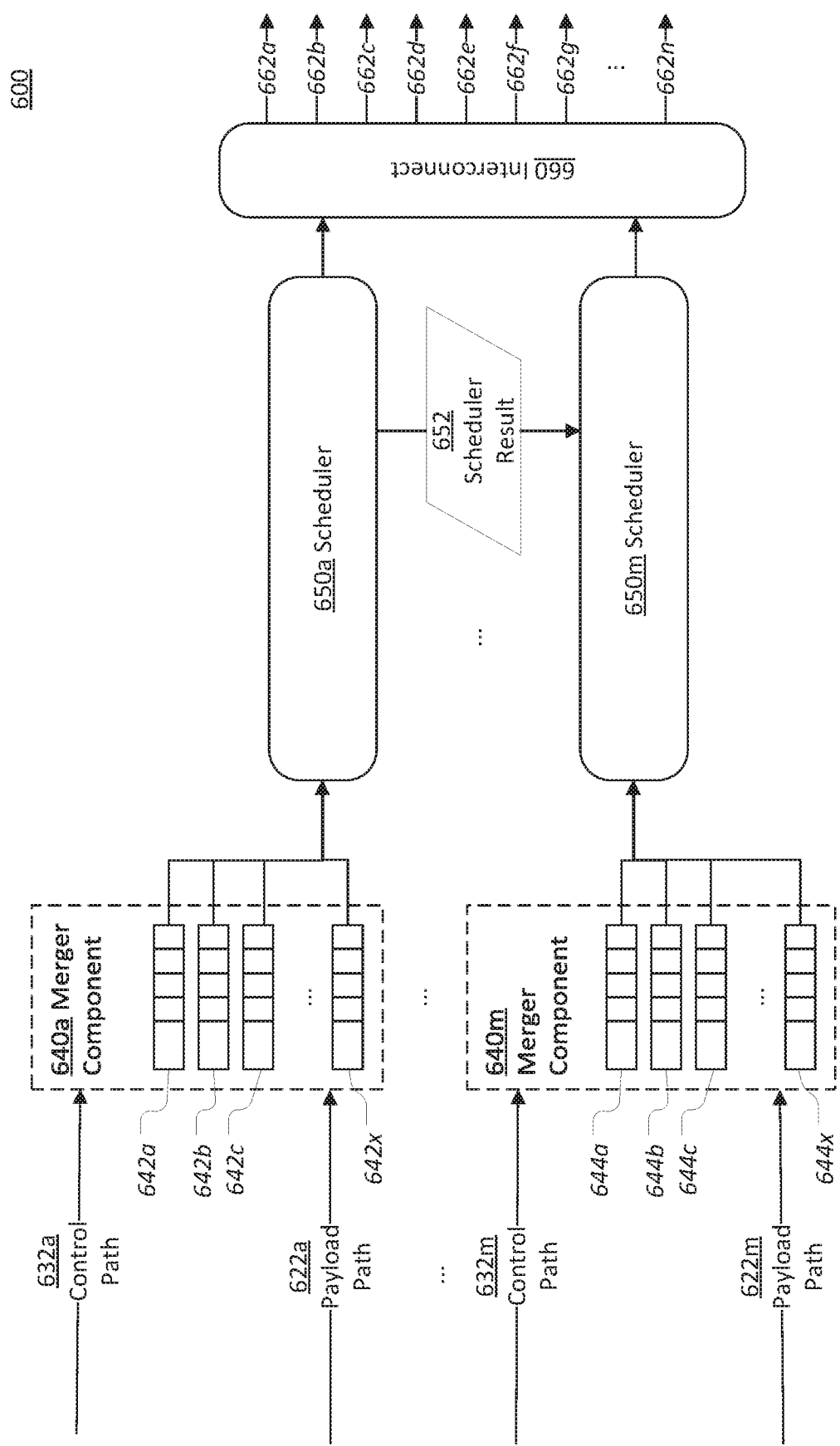
FIG. 6 is an illustrative view of various aspects of an example data handling system comprising multiple merging components.

FIG. 6 is an illustrative view of various aspects of an example data handling system 600 comprising multiple merging components, according to an embodiment. Data handling system 600 is in many aspects similar to data handling system 400 of FIG. 4 and data handling system 100 of FIG. 1. For instance, system 600 includes multiple schedulers 650a-650m that are similar to schedulers 450a-450m. System 600 further includes an interconnect 660 that is similar to interconnect 460. Although not depicted, it will be understood that system 600 may in some embodiments likewise include a receiver such as receiver 120 and a control information generator such as control information generator 130.

However, system 600 comprises two or more merging components 640a-640m, collectively merging components 640. The two or more merging components collectively act as a merging subsystem by which control information and payload data is merged before being passed to interconnect 660. Each merging component 640 comprises its own set of one or more memories for storing data. For instance, merger component 640a comprises memories 642a-642x, while merger component 640m comprises memories 644a-644x. Both memories 642 and 644 are similar to, for example, memories 142.

Each merger component 640 is coupled to its own control path 632 and payload 622, thus meaning system 600 also has multiple control paths 632a-622m and multiple corresponding payload paths 622a-622m. In an embodiment, each control path 632/payload path 622 pairing may correspond to, for example, a different group of ports and/or a different reception component.

Each of merging components 640a-650m is assigned its own scheduler 650a-650m, and all of the schedulers 650 are connected to a single interconnect 660. Again, selection information 652 may be shared between each of schedulers 650 to prevent various resource conflicts, such as of the same output interface of interconnect 660.

This architecture, among other aspects, reduces the bandwidth requirement on a single memory instance in the memory subsystem of the merger component.

3.6. Other Examples

In an embodiment, a networking device may have M interconnects, multiple schedulers for each of the M interconnects, and a merging component for each scheduler. In an embodiment, a networking device may have M interconnects, multiple schedulers for each of the M interconnects, and multiple merging components, where more than one scheduler is attached to each merging component. Such embodiments may, among other aspects, increase the bandwidth to each single destination while improving the interconnect bandwidth utilization for each interconnect and reducing the bandwidth demand on a single memory instance in the merging component.

4.0. Example Process Flow

Figure 7:
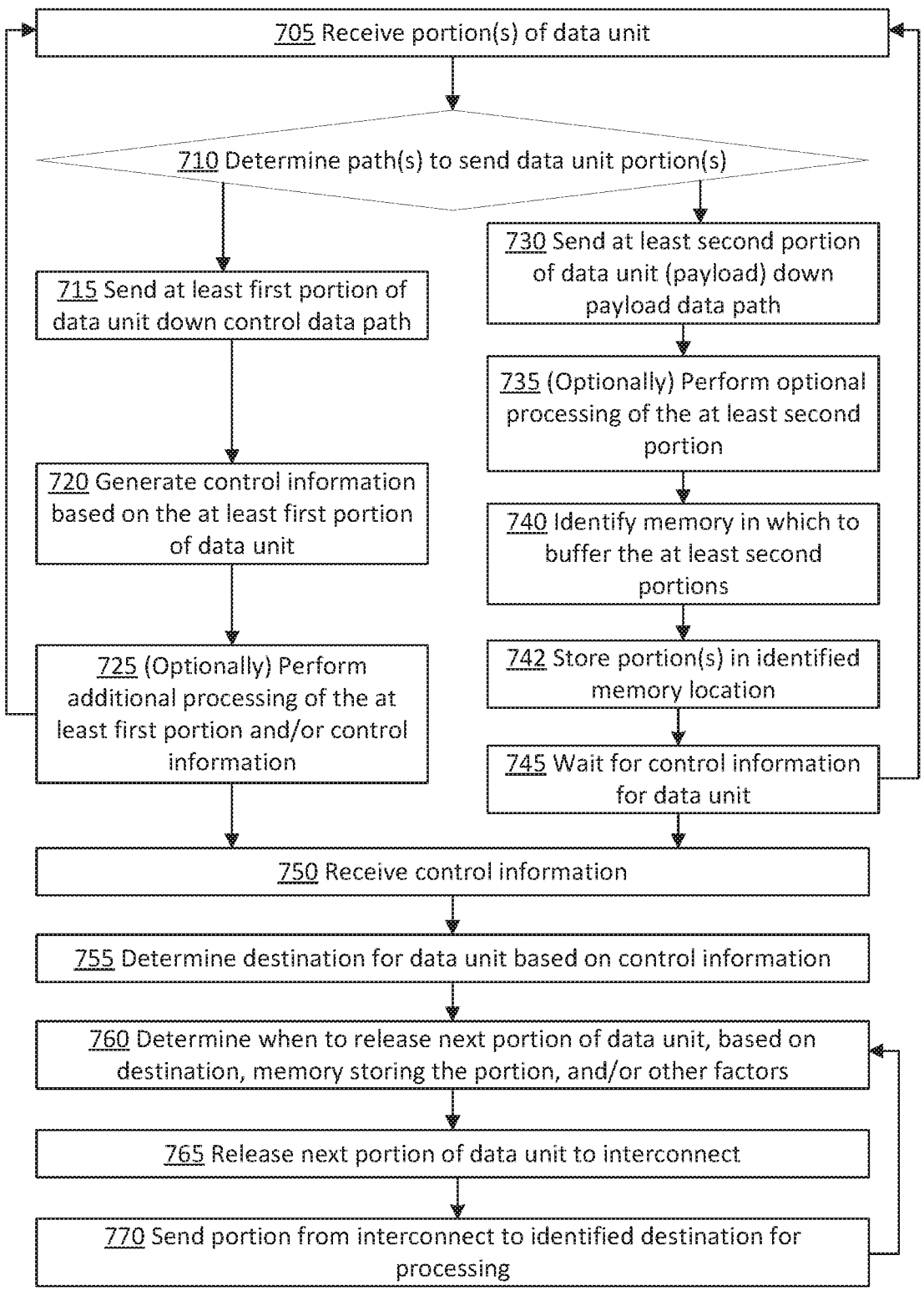
FIG. 7 illustrates an example flow for handling a data unit.

FIG. 7 illustrates an example flow 700 for handling a data unit, according to an embodiment. The various elements of flow 700 may be performed in a variety of systems, including systems such as system 100 described above. In an embodiment, each of the processes described in connection with the functional blocks described below may be implemented using one or more integrated circuits, computer programs, other software elements, and/or digital logic in any of a general-purpose computer or a special-purpose computer, while performing data retrieval, transformation, and storage operations that involve interacting with and transforming the physical state of memory of the computer.

Block 705 comprises receiving at least a portion of a data unit, such as a cell, frame, packet, or any other suitable data unit or subunit. For instance, block 705 may comprise receiver 120 receiving a data unit 110, or receiver 220 receiving one of cells 211-219.

Block 710 comprises determining a path along which to send portion(s) of the data unit. The portions in block 710 need not necessarily directly correspond to the portions received in block 705. For instance, in an embodiment, a receiver may divide a data unit or subunit received in block 705 into smaller portions for sending down different paths. Thus, for instance, if an entire data unit is received at once in block 705, that data unit may be split into different portions or the purposes of block 710.

The path may be a control path, such as control path 132, or a payload path, such as payload path 122. The determination of the path generally comprises determining whether the portion includes information potentially relevant to determining control information for the data unit, such as a packet header, SOP, or other relevant metadata. If so, the portion may be sent along the control path. Otherwise, the portion may be sent along the payload path. Although in many embodiments, this means that the first portion, or set of portions, of a data unit are sent along the control path, in an embodiment, any portion may be determined potentially relevant to determining control information, even if the immediately preceding portion was not determined relevant.

In an embodiment, portions sent along the control path may be duplicated and sent along the payload path as well. In other embodiments, a portion is only sent along one path.

If the portion is sent along the control path, per block 715, then, in block 720, control information is generated for the data unit based upon that portion. For instance, a control information generator 130 may generate control information 134 for the data unit based on the portion and potentially other portions already sent down the control path, if any. The control information generally indicates a destination for the data packet, such as a destination component, queue, buffer, memory location, port, and/or other suitable destination. The control information may further include a variety of other information, as described in other sections.

Optionally, at block 725, the control information may undergo additional processing by one or more additional components along the control path.

As blocks 715-725 are performed for the portion(s) of the data unit sent along the control path, in some embodiments, additional portions may of the data unit may be received per block 705. These additional portions may be routed, per block 710, along the payload path.

For portions of the data unit sent along the payload path, per block 730, flow 700 may optionally comprise processing of the portion(s) by one or more processing components in block 735, depending on the embodiment. Block 740 then comprises identifying a memory in which to buffer the portion(s) that were sent along the payload path. For instance, a merger component 140 may determine which memory 142 to store the portion(s) in, as described in other sections. Block 742 comprises storing the portion(s) in the identified memory.

Block 745 comprises waiting for control information for the data unit, since traverse of the control path may take significantly longer than traverse of the payload path. Of course, the implementing hardware would not necessarily wait idly during this time, but may be receiving additional portions of the data unit, per block 705, and/or concurrently processing any number of other recently received data units or subunits using other instances of flow 700.

Block 750 comprises receiving the control information for the data unit, such as by a merger component that is buffering the payload of the data unit. The control information may be received embedded in, or in association with, any portion(s) sent along the control path that were not sent along the payload path. In an embodiment, these portions, as well as the control information, may then be buffered as well.

Block 755 comprises determining a destination for the data unit based on the control information. Block 760 comprises determining when to release a first portion of the data unit, if none have yet been dispatched, or a next portion of the data unit otherwise. Block 760 may comprise using scheduling techniques such as described in other sections. For instance, scheduler 150 may determine an optimal time to release each portion of the data unit based on factors such as the identified destination, the memory in which the data unit is stored, the destinations or memory locations of other buffered data units, a priority level of the data unit, and so forth.

Block 765 comprises releasing the next data unit portion to the interconnect at the determined time. The portion includes, or is associated, with the control information, to indicate to the interconnect where to send the next data unit portion.

Block 770 comprises sending the portion from the interconnect to the identified destination, such as by writing the portion to a location (e.g. a register or buffer) associated with destination, or outputting the portion to circuitry that is directly coupled to an input of the destination processing component. In an embodiment, rather than sending the portion directly, block 770 may comprise sending an address or identifier associated with the portion to the destination processing component.

From block 770, flow may return to block 760 for dispatch of any remaining portion(s) of the data unit.

Flow 700 illustrates only one of many possible flows for handling data units. Other flows may include fewer, additional, or different elements, in varying arrangements. For example, in some embodiments, blocks 705-735 may be omitted, along with any other elements relied upon exclusively by the omitted element(s).

5.0. Example Embodiments

Examples of some embodiments are represented, without limitation, in the following clauses.

According to an embodiment, an apparatus comprises: a merger subsystem configured to receive payload data for data units and corresponding control information for the data units, the merger subsystem comprising one or more memories in which the merger subsystem is configured to buffer at least some of the payload data for a given data unit at least until receiving given control information corresponding to the given data unit; an interconnect configured to input particular payload data of particular data units and output the particular payload data to destinations that are respectively indicated by particular control information for the particular data units; a scheduler subsystem configured to schedule dispatch of the particular payload data of the particular data units from the merger subsystem to the interconnect.

In an embodiment, the scheduler subsystem is configured to dispatch at least first payload data for at least first data units in an order that is different than a sequence in which corresponding first control information for the first data units is received by the merger subsystem.

In an embodiment, the scheduler subsystem is configured to determine when to schedule dispatch of specific payload data of specific data units in an order based on one or more of: which of the specific data units were received through which specific incoming ports, bandwidths associated with the incoming ports, which of the specific data units are to be sent through which one or more outgoing ports, bandwidths associated with the one or more outgoing ports, or priority levels associated with the data units.

In an embodiment, the scheduler subsystem is configured to determine when to schedule dispatch of specific payload data of specific data units in an order based on which the particular data units are destined for which one or more of the destinations, as respectively indicated by the particular control information, each of the destinations corresponding to a different one or more output interfaces of the interconnect, the scheduler subsystem configured to optimize utilization of the output interfaces of the interconnect.

In an embodiment, the merger subsystem comprises a plurality of memories in which the payload data is buffered, wherein the scheduler subsystem is configured to schedule dispatch of the specific payload data of specific data units in an order based on which of the specific data units have payload data buffered in which of the memories, the scheduler subsystem configured to optimize utilization of the plurality of memories.

In an embodiment, the data units are network packets, wherein receiving the payload data comprises receiving, over time, individual cells or frames of the network packets, wherein dispatching the particular payload data comprises dispatching, over time, the individual cells or frames of the network packets, and wherein the destinations are processing components of a network device, ports of the network device, or memory locations associated with the processing components or ports.

In an embodiment, the merger subsystem receives given payload data for the given data unit as a series of separate portions, a first set of the distinct portions received before the given control information, and a second set of the separate portions received after the given control information, the first set of the separate portions becoming available for dispatch by the scheduler only after the given control information is received, the second set of the separate portions becoming available for dispatch by the scheduler upon arrival at the merger subsystem.

In an embodiment, given payload data for the given data unit is received as a single portion, and wherein the interconnect is configured to send the entire given data unit to a given destination as a single portion.

In an embodiment, the scheduling subsystem comprises a plurality of scheduler components, each scheduler component configured to select, during a particular interval, a different data unit portion of the particular data units to dispatch to the interconnect, a first scheduler component configured to send selection metadata to a second scheduler component, the selection metadata indicating one or more of a first data unit portion selected for dispatch by the first scheduler component, a memory in which the first data unit portion was buffered, and/or a location to which the first data unit portion was sent, the second scheduler component configured to use the selection metadata to avoid also selecting the first data unit portion, memory, and/or destination during the particular interval.

In an embodiment, the particular interval is a defined number of clock cycles.

In an embodiment, the apparatus further comprises a plurality of interconnects, each of the interconnects coupled to a different scheduler component of the plurality of scheduler components and configured to receive specific data unit portions selected by that scheduler component.

In an embodiment, the merger subsystem comprises a plurality of merger components, each merger component configured to receive payload data and control information from a different set of data paths, wherein the scheduling subsystem comprises a plurality of scheduler components, each scheduler component coupled to a different merger component and configured to schedule dispatch only of payload data buffered by the merger component coupled to the scheduler component.

In an embodiment, the apparatus further comprises: a receiving component configured to receive the data units, send at least first portions of the data units to a control information generation component, and send at least second portions of the data units as the payload data to the merger subsystem; and said control information generation component, configured to generate the control information based on the first portions of the data units, and send the control information to the merger subsystem.

In an embodiment, the merger subsystem, interconnect, and scheduler subsystem are implemented by one or more Field-Programmable Gate Arrays (FPGAs) or Application-specific Integrated Circuits (ASICs).

According to an embodiment, a method comprises: receiving first payload data for a first context; buffering the first payload data in a first memory along with payload data for a plurality of contexts; determining when to dispatch particular payload data for particular contexts to an interconnect, wherein the determining comprises determining not to dispatch the first payload data for the first context at least until first control information for the first context has been received; receiving the first control information for the first context; and dispatching the first payload data to the interconnect after receiving the first control information.

In an embodiment, the first payload data is further dispatched after dispatch of second payload data for a second context, the second context having second control information that was received after the first control information.

In an embodiment, the first context and second context correspond to a first network packet and a second network packet, respectively.

In an embodiment, the method further comprises: receiving a first data unit, the first context corresponding to the first data unit; generating the first control information based at least on a first portion of the data unit; wherein the first payload data is at least a second portion of the first data unit, the first payload data buffered while the first control information is being generated.

In an embodiment, the method further comprises determining when to dispatch the first payload data based on one or more of: an incoming port through which a first packet associated with the first context was received, a bandwidth associated with the incoming port relative to bandwidths associated with other incoming ports, identities of one or more outgoing ports through which the first packet is to be sent, bandwidths associated with the one or more outgoing ports relative to bandwidths associated with other outgoing ports, or a priority level associated with the first packet.

In an embodiment, the method further comprises determining when to dispatch the first payload data based on a destination indicated by the first control information, the destination corresponding to a particular output interface of a plurality of output interfaces of the interconnect, the dispatching of the particular payload data scheduled to optimize utilization of the output interfaces.

In an embodiment, the method further comprises: storing specific portions of the particular payload data in different memories of a plurality of memories, including the first memory; determining when to dispatch the first payload data based on in which of the memories the first payload data is buffered, the dispatching of the particular payload data scheduled to optimize utilization of the plurality of memories.

In an embodiment, the first context corresponds to a first network packet, wherein the first payload data is a cell or frame of the first network packet, the method further comprising buffering one or more other cells or frames of the first network packet at least until the first control information is received.

In an embodiment, one or more non-transitory computer-readable media store instructions that, when executed by one or more computing devices, cause performance of one or more of the foregoing methods.

Other examples of these and other embodiments are found throughout this disclosure.

6.0. Implementation Mechanism—Hardware Overview

According to one embodiment, the techniques described herein are implemented by one or more special-purpose computing devices. The special-purpose computing devices may be desktop computer systems, portable computer systems, handheld devices, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques. Such special-purpose computing devices may also combine custom hard-wired logic, ASICs, or FPGAs with custom programming to accomplish the techniques.

Though certain foregoing techniques are described with respect to hardware implementations, which provide a number of advantages in certain embodiments, it will also be recognized that, in other embodiments, the foregoing techniques may still provide certain advantages when performed partially or wholly in software. Accordingly, in such an embodiment, a suitable implementing apparatus comprises a general-purpose hardware processor and is configured to perform any of the foregoing methods by executing program instructions in firmware, memory, other storage, or a combination thereof.

6.1. Example Networking Apparatus

Figure 8:
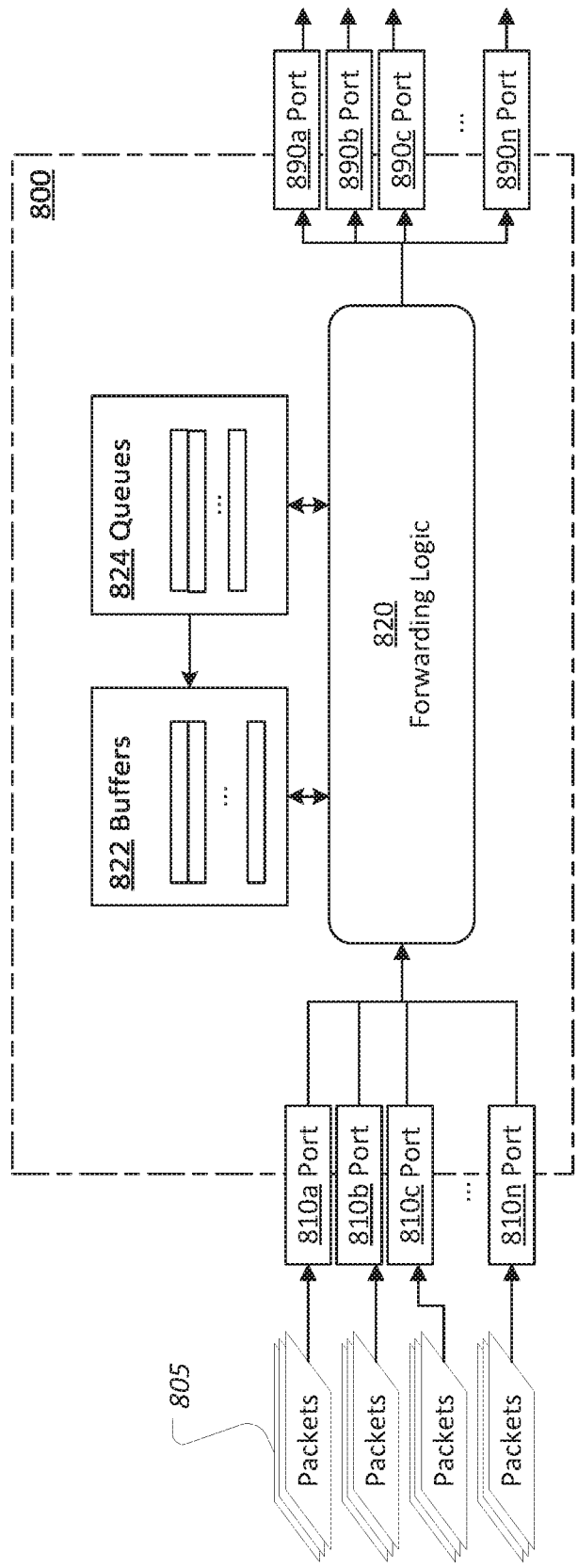
FIG. 8 is an illustrative view of various aspects of an example network device in which techniques described herein may be practiced.

FIG. 8 is an illustrative view of various aspects of an example network device 800 in which techniques described herein may be practiced, according to an embodiment. Network device 800 is a computing device comprising any combination of hardware and software configured to implement the various logical components described herein, including components 810-890. For example, a network device 800 may be a single networking computing device, such as a router or switch, in which some or all of the processing components described herein are implemented using application-specific integrated circuits (ASICs) or field programmable gate arrays (FPGAs). As another example, a network device 800 may include one or more memories storing instructions for implementing various components described herein, one or more hardware processors configured to execute the instructions stored in the one or more memories, and various data repositories in the one or more memories for storing data structures utilized and manipulated by the various components.

Network Messages

Network device 800 is connected to one or more other devices in a network by one or more communication links.

The communication links may be any suitable wired cabling or wireless links. While network device 800 may or may not have a variety of other functions, in an embodiment, network device 800 is configured to send, receive, and/or relay data to one or more other devices via these links. In general, data is communicated as series of discrete units or structures of data represented by signals transmitted over the communication links.

A network device 800 may send, receive, and/or relay data units at different communication levels, or layers, depending on the nature of the device 800. For instance, a device 800 may send a data unit at the network layer (e.g. a TCP segment) to a second device over a path that includes an intermediate device. This data unit will be broken into smaller data units ("subunits") at various sublevels before it is transmitted from the device 800. For example, the data unit may be broken into packets, then cells, and eventually sent out as a collection of signal-encoded bits to the intermediate device. Depending on the network type and/or the device type of the intermediate device, the intermediate device may rebuild the entire original data unit before routing the information to the second device, or the intermediate device may simply rebuild the subunits (e.g. packets or frames) and route those subunits to the second device without ever composing the entire original data unit.

When a device 800 receives a data unit, it typically examines addressing information within the data unit (and/or other information within the data unit) to determine how to process the data unit. The addressing information may be, for instance, an Internet Protocol (IP) address, MPLS label, or any other suitable information. If the addressing information indicates that the receiving device 800 is not the destination for the data unit, the device 800 may look up the destination device within receiving device's routing information, and route the data unit to another device connected to the receiving device based on forwarding instructions associated with the destination device (or an address group to which the destination node belongs). The forwarding instructions may indicate, for instance, an outgoing port over which to send the message, a label to attach the message, etc. In cases where multiple paths to the destination device are possible, the forwarding instructions may include information indicating a suitable approach for selecting one of those paths, or a path deemed to be the best path may already be defined.

Addressing information, flags, labels, and other metadata used for determining how to handle a data unit is typically embedded within a portion of the data unit known as the header. The header is typically at the beginning of the data unit, and is followed by the payload of the data unit, which is the information actually being sent in the data unit. A header is typically comprised of fields of different types, such as a destination address field, source address field, destination port field, source port field, and so forth. In some protocols, the number and the arrangement of fields may be fixed. Other protocols allow for arbitrary numbers of fields, with some or all of the fields being preceded by type information that explains to a node the meaning of the field.

A traffic flow is a sequence of data units, such as packets, from a source computer to a destination. In an embodiment, the source of the traffic flow may mark each data unit in the sequence as a member of the flow using a label, tag, or other suitable identifier within the data unit. In another embodiment, the flow is identified by deriving an identifier from other fields in the data unit (e.g. a "five-tuple" combination of a source address, source port, destination address, destination port, and protocol). A flow is often intended to be sent in sequence, and network devices are therefore typically configured to send all data units within a given flow along a same path to ensure that the flow is received in sequence.

For convenience, many of the techniques described in this disclosure are described with respect to routing IP packets in an L3 (level 3) network, in which context the described techniques have particular advantages. It will be recognized, however, that these techniques may also be applied to realize advantages in routing other types of data units conforming to other protocols and/or at other communication layers within a network. Thus, unless otherwise stated or apparent, the term "packet" as used herein should be understood to refer to any type of data structure communicated across a network, including packets as well as segments, cells, data frames, datagrams, and so forth.

Ports

Network device 800 includes ports 810/290 by which communication links with other devices in a network are formed. Ports 810, including ports 810a-n, are inbound ("ingress") ports by which data units referred to herein as packets 805 are received over a network. Ports 890, including ports 890a-n, are outbound ("egress") ports by which at least some of the packets 805 are sent out to other destinations within the network, after having been processed by the network device 800.

Ports 810/290 are depicted as separate ports for illustrative purposes, but may actually correspond to the same physical hardware ports on the network device 810. That is, a network device 800 may both receive packets 805 and send packets 805 over a single physical port, and the single physical port may thus function as both an ingress port 810 and egress port 890. Nonetheless, for various functional purposes, certain logic of the network device 800 may view a single physical port as a separate ingress port 810 and egress port 890. Moreover, for various functional purposes, certain logic of the network device 800 may subdivide a single ingress port 810 or egress port 890 into multiple ingress ports 810 or egress ports 890, or aggregate multiple ingress ports 810 or multiple egress ports 890 into a single ingress port 810 or egress port 890. Hence, in various embodiments, ports 810 and 890 should be understood as distinct logical constructs that are mapped to physical ports rather than simply as distinct physical constructs.

Traffic Management

Since not all packets 805 received by the device 800 can be processed by the packet processor(s) 850 at the same time, a traffic manager 821 of device 800 may store packets 805 in temporary memory structures referred to as buffers 822 while the packets 805 are waiting to be processed. For example, the device's forwarding logic 820 may only be capable of processing a certain number of packets 805, or portions of packets 805, in a given clock cycle, meaning that other packets 805, or portions of packets 805, must either be ignored (i.e. dropped) or stored. At any given time, a large number of packets 805 may be stored in the buffers 822 of the device 800, depending on network traffic conditions.

A buffer 822 may be a portion of any type of memory, including volatile memory and/or non-volatile memory. Device 800 includes a buffer manager configured to manage use of buffers 822 by device 800. Among other processing tasks, the buffer manager may, for example, allocate and deallocate specific segments of memory for buffers 822, create and delete buffers 822 within that memory, identify available buffer(s) 822 in which to store a newly received packet 805, maintain a mapping of buffers 822 to packets 805 stored in those buffers 822 (e.g. by a packet sequence number assigned to each packet 805 as the packet 805 is received), mark a buffer 822 as available when a packet 805 stored in that buffer 822 is dropped or sent from the device 800, determine when to drop a packet 805 instead of storing the packet 805 in a buffer 822, and so forth.

A packet 805, and the buffer(s) 822 in which it is stored, is said to belong to a construct referred to as a queue 824. A queue 824 may be a distinct, continuous portion of the memory in which buffers 822 are stored. Or, a queue 824 may instead be a set of linked memory locations (e.g. linked buffers 822). In some embodiments, the number of buffers 822 assigned to a given queue 824 at a given time may be limited, either globally or on a per-queue basis, and this limit may change over time.

The forwarding logic 820 of device 800 may process a packet 805 over one or more stages. A node may have many queues 824, and each stage of processing may utilize one or more of the queues 824 to regulate which packet 805 is processed at which time. To this end, a queue 824 arranges its constituent packets 805 in a sequence, such that each packet 805 corresponds to a different node in an ordered series of nodes. The sequence in which the queue 824 arranges its constituent packets 805 generally corresponds to the sequence in which the packets 805 in the queue 824 will be processed.

The traffic manager 821 is a component that manages the use of buffers 822 to store packets 805 (or copies thereof), assigns buffers 822 to queues 824, and manages the flow of packets 805 through the queues 824. The traffic manager 821 may, for instance, determine when to "dequeue" packets 805 from queues 824 and provide those packets 805 to specific packet processor(s) of forwarding logic 820. The traffic manager 821 may further identify a specific queue 824 to assign a packet 805 to.

Forwarding Logic

A device 800 comprises one or more packet processing components that collectively implement forwarding logic 820 by which the device 800 is configured to determine how to handle each packet the device 800 receives. Forwarding logic 820, or portions thereof, may, in some instances, be hard-coded. For instance, specific hardware or software within the node may be configured to always react to certain types of data units in certain circumstances in a certain way. Forwarding logic 820, or portions thereof, may also be configurable, in that the logic 820 changes over time in response to data collected from or instructions received from other nodes in the network in which the device 800 is located.

For example, a device 800 will typically store in its memories one or more forwarding tables (or equivalent structures) that map certain data unit attributes or characteristics to actions to be taken with respect to data units having those attributes or characteristics, such as sending the data unit to a selected path, or processing the data unit using a specified internal component. For example, such attributes or characteristics may include a Quality-of-Service level specified by the data unit or associated with another characteristic of the data unit, a flow control group, an ingress port 810 through which the data unit was received, a tag or label in the packet's header, a source address, destination address, packet type, or any other suitable distinguishing property.

In an embodiment, forwarding logic 820 may read port state data 855. Port state data 855 may include, for instance, flow control state information describing various traffic flows and associated traffic flow control rules or policies, link status information indicating links that are up or down, port utilization information indicating how ports are being utilized (e.g. utilization percentages, utilization states, etc.). Forwarding logic 820 may be configured to implement the associated rules or policies associated with the flow(s) to which a given packet belongs.

Forwarding logic 820 may process a data unit over multiple stages. At each stage, the data unit is placed in a buffer 822, which is said to belong to a queue 824. A device 800 may have many queues 824, and each stage of processing may utilize one or more of the queues 824. At any given processing stage, one or more packet processing components, such as a Field Programmable Gate Array (FPGA), Application-Specific Integrated Circuit (ASIC), or a general purpose processor executing software-based instructions, reads data units from associated queues 824 and determines how to handle the data units.

In an embodiment, different queues 824 may exist for different destinations. For example, each port 810 and/or port 890 may have its own set of queues 824. The queue 824 to which an incoming packet 805 is assigned may therefore be selected based on the port 810 through which it was received, while the queue 824 to which an outgoing packet is assigned may be selected based on forwarding information indicating which port 890 the packet should depart from. A different packet processor may be associated with each different set of one or more queues 824. Hence, the current processing context of the packet 805 may be used to select which queue 824 a packet 805 should be assigned to.

In an embodiment, there may also or instead be different queues 824 for different flows or sets of flows. That is, each identifiable traffic flow or group of traffic flows is assigned its own set of queues 824 to which its packets 805 are respectively assigned. In an embodiment, different queues 824 may correspond to different classes of traffic or quality-of-service (QoS) levels. Different queues 824 may also or instead exist for any other suitable distinguishing property of the packets 805, such as source address, destination address, packet type, and so forth.

For instance, a data unit may be forwarded to another queue 824 associated with another processing stage implemented by another set of processing components, sent out of the device 800 over an outbound port 890, discarded, delayed for flow control reasons, and so forth. The collective actions of these processing components over these multiple stages is said to implement the forwarding logic of the device 800.

An example flow of a packet 805 through device 800 is as follows. The packet 805 may be received by a port 810. The packet 805 is then processed by an initial packet processor (in some embodiments known as a packet pre-processor), and then delivered to a traffic manager 821. Traffic manager 821 stores the packet 805 in a buffer 822 and assigns the packet 805 to a queue 824. Traffic manager 821 manages the flow of the packet 805 through the queue 824 until the packet 805 is released to another packet processor. Depending on the processing, the traffic manager 821 may then assign the packet 805 to another queue so that it may be processed by yet another processor, or the packet processor may send the packet 805 out another port 890.

In the course of processing a packet 805, a device 800 may replicate a packet 805 one or more times. For example, a packet 805 may be replicated for purposes such as multicasting, mirroring, debugging, and so forth. Thus, a single packet 805 may be replicated to multiple queues 824. Hence, though certain techniques described herein may refer to the original packet 805 that was received by the device 800, it will be understood that those techniques will equally apply to copies of the packet 805 that have been generated for various purposes.

Device 800 illustrates only one of many possible arrangements of components configured to provide the functionality described herein. Other arrangements may include fewer, additional, or different components, and the division of work between the components may vary depending on the arrangement.

6.2. Example Computing Device

Figure 9:
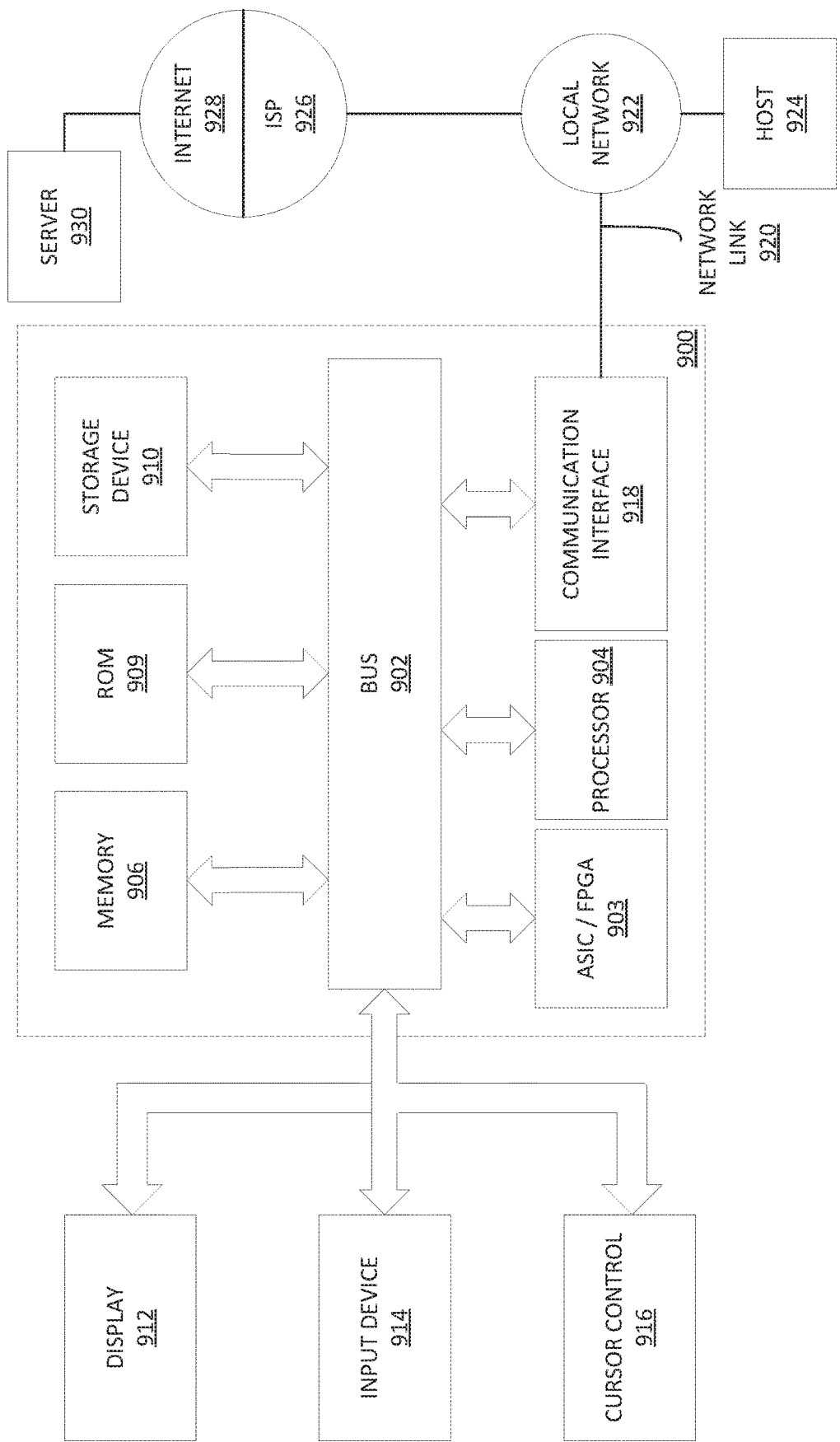
FIG. 9 is block diagram of a computer system upon which embodiments of the inventive subject matter may be implemented.

FIG. 9 is a block diagram that illustrates a computer system 900 that may be utilized in implementing the above-described techniques, according to an embodiment. Computer system 900 may be, for example, a desktop computing device, laptop computing device, tablet, smartphone, server appliance, computing mainframe, multimedia device, handheld device, networking apparatus, or any other suitable device. In an embodiment, FIG. 9 and FIG. 8 are both different views of a same networking device.

Computer system 900 may include one or more ASICs, FPGAs, or other specialized circuitry 903 for implementing program logic as described herein. For example, circuitry 903 may include fixed and/or configurable hardware logic blocks for implementing some or all of the described techniques, input/output (I/O) blocks, hardware registers or other embedded memory resources such as random access memory (RAM) for storing various data, and so forth. The logic blocks may include, for example, arrangements of logic gates, flip-flops, multiplexers, and so forth, configured to generate an output signals based on logic operations performed on input signals.

Additionally, and/or instead, computer system 900 may include one or more hardware processors 904 configured to execute software-based instructions. Computer system 900 may also include one or more busses 902 or other communication mechanism for communicating information. Busses 902 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 900 also includes one or more memories 906, such as a RAM, hardware registers, or other dynamic or volatile storage device for storing data units to be processed by the one or more ASICs, FPGAs, or other specialized circuitry 903. Memory 906 may also or instead be used for storing information and instructions to be executed by processor 904. Memory 906 may be directly connected or embedded within circuitry 903 or a processor 904. Or, memory 906 may be coupled to and accessed via bus 902. Memory 906 also may be used for storing temporary variables, data units describing rules or policies, or other intermediate information during execution of program logic or instructions.

Computer system 900 further includes one or more read only memories (ROM) 908 or other static storage devices coupled to bus 902 for storing static information and instructions for processor 904. One or more storage devices 910, such as a solid-state drive (SSD), magnetic disk, optical disk, or other suitable non-volatile storage device, may optionally be provided and coupled to bus 902 for storing information and instructions.

A computer system 900 may also include, in an embodiment, one or more communication interfaces 918 coupled to bus 902. A communication interface 918 provides a data communication coupling, typically two-way, to a network link 920 that is connected to a local network 922. For example, a communication interface 918 may be an integrated services digital network (ISDN) card, cable modem, satellite modem, or a modem to provide a data communication connection to a corresponding type of telephone line. As another example, the one or more communication interfaces 918 may include a local area network (LAN) card to provide a data communication connection to a compatible LAN. As yet another example, the one or more communication interfaces 918 may include a wireless network interface controller, such as a 802.11-based controller, Bluetooth controller, Long Term Evolution (LTE) modem, and/or other types of wireless interfaces. In any such implementation, communication interface 918 sends and receives electrical, electromagnetic, or optical signals that carry digital data streams representing various types of information.

Network link 920 typically provides data communication through one or more networks to other data devices. For example, network link 920 may provide a connection through local network 922 to a host computer 924 or to data equipment operated by a Service Provider 926. Service Provider 926, which may for example be an Internet Service Provider (ISP), in turn provides data communication services through a wide area network, such as the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

In an embodiment, computer system 900 can send messages and receive data through the network(s), network link 920, and communication interface 918. In some embodiments, this data may be data units that the computer system 900 has been asked to process and, if necessary, redirect to other computer systems via a suitable network link 920. In other embodiments, this data may be instructions for implementing various processes related to the described techniques. For instance, in the Internet example, a server 930 might transmit a requested code for an application program through Internet 928, ISP 926, local network 922 and communication interface 918. The received code may be executed by processor 904 as it is received, and/or stored in storage device 910, or other non-volatile storage for later execution. As another example, information received via a network link 920 may be interpreted and/or processed by a software component of the computer system 900, such as a web browser, application, or server, which in turn issues instructions based thereon to a processor 904, possibly via an operating system and/or other intermediate layers of software components.

Computer system 900 may optionally be coupled via bus 902 to one or more displays 912 for presenting information to a computer user. For instance, computer system 900 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 912 may include, without limitation, plasma display devices, projectors, cathode ray tube (CRT)

monitors, electronic paper, virtual reality headsets, braille terminal, and/or any other suitable device for outputting information to a computer user. In an embodiment, any suitable type of output device, such as, for instance, an audio speaker or printer, may be utilized instead of a display 912.

One or more input devices 914 are optionally coupled to bus 902 for communicating information and command selections to processor 904. One example of an input device 914 is a keyboard, including alphanumeric and other keys. Another type of user input device 914 is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane. Yet other examples of suitable input devices 914 include a touch-screen panel affixed to a display 912, cameras, microphones, accelerometers, motion detectors, and/or other sensors. In an embodiment, a network-based input device 914 may be utilized. In such an embodiment, user input and/or other information or commands may be relayed via routers and/or switches on a Local Area Network (LAN) or other suitable shared network, or via a peer-to-peer network, from the input device 914 to a network link 920 on the computer system 900.

As discussed, computer system 900 may implement techniques described herein using customized hard-wired logic, one or more ASICs or FPGAs 903, firmware and/or program logic, which in combination with the computer system causes or programs computer system 900 to be a special-purpose machine. According to one embodiment, however, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and use a modem to send the instructions over a network, such as a cable network or cellular network, as modulated signals. A modem local to computer system 900 can receive the data on the network and demodulate the signal to decode the transmitted instructions. Appropriate circuitry can then place the data on bus 902. Bus 902 carries the data to main memory 906, from which processor 904 retrieves and executes the instructions. The instructions received by main memory 906 may optionally be stored on storage device 910 either before or after execution by processor 904.

7.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the inventive subject matter have been described with reference to numerous specific details that may vary from implementation to implementation. Thus, the sole and exclusive indicator of what is the inventive subject matter, and is intended by the applicants to be the inventive subject matter, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

We claim:

1. An apparatus comprising:
   a merger subsystem configured to receive payload data for data units and corresponding control information for the data units, the merger subsystem comprising one or more memories in which the merger subsystem is configured to buffer at least some of the payload data for a given data unit at least until receiving given control information corresponding to the given data unit, the data units including at least particular data units, each of whose payload data is divided into multiple portions;
one or more interconnects configured to input portions of the data units and output the portions of the data units to destinations that are respectively indicated by the corresponding control information for the data units;
a scheduler subsystem configured to schedule dispatch of the portions of the data units from the merger subsystem to the one or more interconnects, the scheduling subsystem comprises a plurality of scheduler components, each scheduler component configured to select, during a particular interval, a different data unit portion to dispatch to the one or more interconnects, each different data unit portion outputted to a different destination of the one or more interconnects.

2. The apparatus of claim 1, wherein the scheduler subsystem is configured to dispatch at least first portions for at least first data units in an order that is different than a sequence in which corresponding first control information for the first data units is received by the merger subsystem.

3. The apparatus of claim 1, wherein the scheduler subsystem is configured to determine when to schedule dispatch of specific portions of specific data units in an order based on one or more of: which of the specific data units were received through which incoming ports, bandwidths associated with the incoming ports, which of the specific data units are to be sent through which one or more outgoing ports, bandwidths associated with the one or more outgoing ports, or priority levels associated with the data units.

4. The apparatus of claim 1, wherein the scheduler subsystem is configured to determine when to schedule dispatch of specific portions of specific data units in an order based on which of the specific data units are destined for which one or more of the destinations, as respectively indicated by the control information, each of the destinations corresponding to a different one or more output interfaces of the one or more interconnects, the scheduler subsystem configured to optimize utilization of the one or more output interfaces of the one or more interconnects.

5. The apparatus of claim 1, wherein the merger subsystem comprises a plurality of memories in which the payload data is buffered, wherein the scheduler subsystem is configured to schedule dispatch of specific portions of specific data units in an order based on which of the specific data units have buffered in which of the memories, the scheduler subsystem configured to optimize utilization of the plurality of memories.

6. The apparatus of claim 1, wherein the data units are network packets, wherein receiving the payload data comprises receiving, over time, individual portions of the network packets, the portions being cells or frames of the network packets, and wherein the destinations are processing components of a network device, ports of the network device, or memory locations associated with the processing components or ports.

7. The apparatus of claim 1, wherein the merger subsystem is configured to receives first payload data for a first data unit as a series of separate first portions, a first set of the first portions received before first control information for the first data unit, and a second set of the first portions received after the first control information, the first set of the first portions becoming available for dispatch by the scheduler subsystem only after the first control information is received, the second set of the first portions becoming available for dispatch by the scheduler subsystem upon arrival at the merger subsystem.

8. The apparatus of claim 1, wherein a first scheduler component of the plurality of scheduler components is configured to send selection metadata to a second scheduler component of the plurality of scheduler components, the selection metadata indicating one or more of a first data unit portion selected for dispatch by the first scheduler component in the particular interval, a memory in which the first data unit portion was buffered, and/or a destination to which the first data unit portion was sent, the second scheduler component configured to use the selection metadata to avoid also selecting the first data unit portion, memory, and/or destination during the particular interval.

9. The apparatus of claim 1, wherein the one or more interconnects includes a plurality of interconnects, each of the interconnects coupled to a different scheduler component of the plurality of scheduler components and configured to receive specific data unit portions selected by that scheduler component.

10. The apparatus of claim 1, wherein the merger subsystem comprises a plurality of merger components, each merger component configured to receive payload data and control information from a different set of data paths, wherein each scheduler component is coupled to a different merger component and configured to schedule dispatch only of those portions of the data units that are buffered by the merger component coupled to the scheduler component.

11. The apparatus of claim 1, further comprising:
a receiving component configured to receive the data units, send at least first portions of the data units to a control information generation component, and send at least second portions of the data units as the payload data to the merger subsystem;
said control information generation component, configured to generate the control information based on the first portions of the data units, and send the control information to the merger subsystem.

12. The apparatus of claim 1, wherein the merger subsystem, the one or more interconnects, and the scheduler subsystem are implemented by one or more Field-Programmable Gate Arrays (FPGAs) or Application-specific Integrated Circuits (ASICs).

13. A method comprising:
receiving payload data for data units, the data units including at least particular data units, each of whose payload data is divided into multiple portions;
receiving corresponding control information for the data units;
buffering at least some of the payload data in one or more memories, the buffering including buffering at least given payload data for a given data unit at least until receiving given control information corresponding to the given data unit;
scheduling dispatch of portions of the data units from the merger subsystem to one or more interconnects, the scheduling including, during a particular interval, selecting a plurality of different data unit portions to dispatch to the one or more interconnects, each of the different data unit portions to be outputted to a different destination of the one or more interconnects;
outputting the portions of the data units from the one or more interconnects to destinations that are respectively indicated by the corresponding control information for the data units.

14. The method of claim 13, further comprising: dispatching at least first portions for at least first data units in an order that is different than a sequence in which corresponding first control information for the first data units is received.

15. The method of claim 13, further comprising determining when to schedule dispatch of specific portions of specific data units in an order based on one or more of: which of the specific data units were received through which incoming ports, bandwidths associated with the incoming ports, which of the specific data units are to be sent through which one or more outgoing ports, bandwidths associated with the one or more outgoing ports, or priority levels associated with the data units.

16. The method of claim 13, further comprising determining when to schedule dispatch of specific portions of specific data units in an order based on which of the specific data units are destined for which one or more of the destinations, as respectively indicated by the control information, each of the destinations corresponding to a different one or more output interfaces of the one or more interconnects, the scheduling configured to optimize utilization of the one or more output interfaces of the one or more interconnects.

17. The method of claim 13, wherein the one or more memories comprise a plurality of memories in which the payload data is buffered, wherein the scheduling is configured to schedule dispatch of specific portions of specific data units in an order based on which of the specific data units have payload data buffered in which of the memories.

18. The method of claim 13, wherein the data units are network packets, wherein receiving the payload data comprises receiving, over time, individual portions of the network packets, the portions being cells or frames of the network packets, and wherein the destinations are processing components of a network device, ports of the network device, or memory locations associated with the processing components or ports.

19. The method of claim 13, further comprising generating the control information based on header portions of the data units, while remaining portions of the data units are being buffered in the one or more memories.

20. One or more non-transitory computer-readable media storing instructions that, when executed by one or more computing devices, cause:
  receiving payload data for data units, the data units including at least particular data units, each of whose payload data is divided into multiple portions;
  receiving corresponding control information for the data units;
  buffering at least some of the payload data in one or more memories, the buffering including buffering at least given payload data for a given data unit at least until receiving given control information corresponding to the given data unit;
  scheduling dispatch of portions of the data units from the merger subsystem to one or more interconnects, the scheduling including, during a particular interval, selecting a plurality of different data unit portions to dispatch to the one or more interconnects, each of the different data unit portions to be outputted to a different destination of the one or more interconnects;
  outputting the portions of the data units from the one or more interconnects to destinations that are respectively indicated by the corresponding control information for the data units.

* * * * *

UNITED STATES PATENT AND TRADEMARK OFFICE
CERTIFICATE OF CORRECTION

Page 1 of 1

PATENT NO. : 10,554,572 B1
APPLICATION NO. : 15/433825
DATED : February 4, 2020
INVENTOR(S) : Matthews et al.

It is certified that error appears in the above-identified patent and that said Letters Patent is hereby corrected as shown below:

Column 27
Claim 5: Line 49: Delete "have" and insert --have payload data--

Column 27
Claim 7: Line 61: Delete "receives" and insert --receive--

Signed and Sealed this
Third Day of March, 2020

Andrei Iancu
*Director of the United States Patent and Trademark Office*